May 7, 1963  P. KOLT  3,088,174
METHOD OF PRODUCING A REINFORCED PLASTIC DIE
Filed Jan. 28, 1959  2 Sheets-Sheet 1

INVENTOR.
Paul Kolt
BY
ATTORNEY

May 7, 1963            P. KOLT            3,088,174

METHOD OF PRODUCING A REINFORCED PLASTIC DIE

Filed Jan. 28, 1959            2 Sheets-Sheet 2

INVENTOR.
Paul Kolt
BY
G. N. Shanofo
ATTORNEY

United States Patent Office
3,088,174
Patented May 7, 1963

3,088,174
METHOD OF PRODUCING A REINFORCED PLASTIC DIE
Paul Kolt, Ferndale, Mich., assignor to General Motors Corporation, Detroit, Mich., a corporation of Delaware
Filed Jan. 28, 1959, Ser. No. 789,620
7 Claims. (Cl. 18—59)

This invention relates to a reinforced plastic die for use in sheet metal stamping operations and to a process of forming such a die. More particularly the present invention pertains to a composite stamping die having a contoured working surface of a filled epoxy resin which is supported by wire mesh reinforced epoxy resin layers.

The cost of tooling for the manufacture of stamped metal parts has always been very high, chiefly because of the expense of the all metal stamping dies in common use. As is well known, conventional matched metal dies for stamping or punching operations must be contoured extremely accurately. Thus, the forming of such dies requires considerable machining which is both time-consuming and extremely expensive. The high cost of such tooling is particularly significant in the automobile industry since frequent model changes necessitate a complete retooling program at relatively short intervals. Frequently the expense of producing a low-volume production model is prohibitive because of these tooling costs.

It is the practice of the automobile industry to manufacture a limited number of prototype models for test purposes. The building of such prototype models generally necessitates the formation of a number of conventional metal dies. The cost of such dies is similarly quite expensive, as their formation still requires the time-consuming finishing operations which are inherent in the formation of a metal die.

Accordingly, it is a principal object of this invention to solve the above-outlined problems by providing a relatively inexpensive, reinforced plastic stamping or punching die which is not only durable but which is capable of producing sheet metal parts having higher quality and accuracy than those formed by conventional all metal dies. Another object of the invention is to provide a new and improved process for the manufacture of such a reinforced plastic die.

These and other objects are attained in accordance with the present invention with a composite die having a hardened plastic core member. A plurality of layers of metal mesh disposed in a suitable plastic resin form an enveloping layer bonded to the core. This layer, in turn, comprises a backing for a filled plasitc resin which forms a working surface on the die.

Other objects and advantages of this invention will more fully appear from the following detailed description of a preferred embodiment thereof, reference being made to the accompanying drawings, in which.

Figure 1:
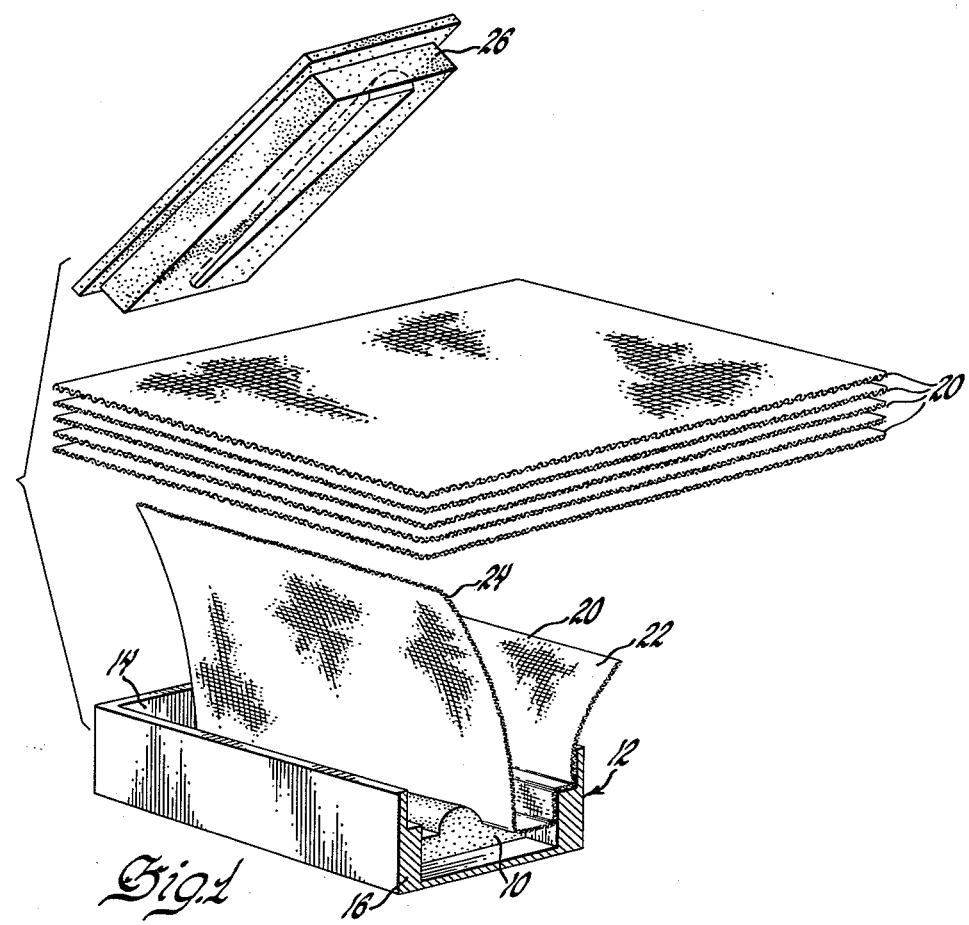
FIGURE 1 is an elevational view in perspective showing a core member, metal screening, and a mold used to form a die in accordance with my invention.
Figure 2:
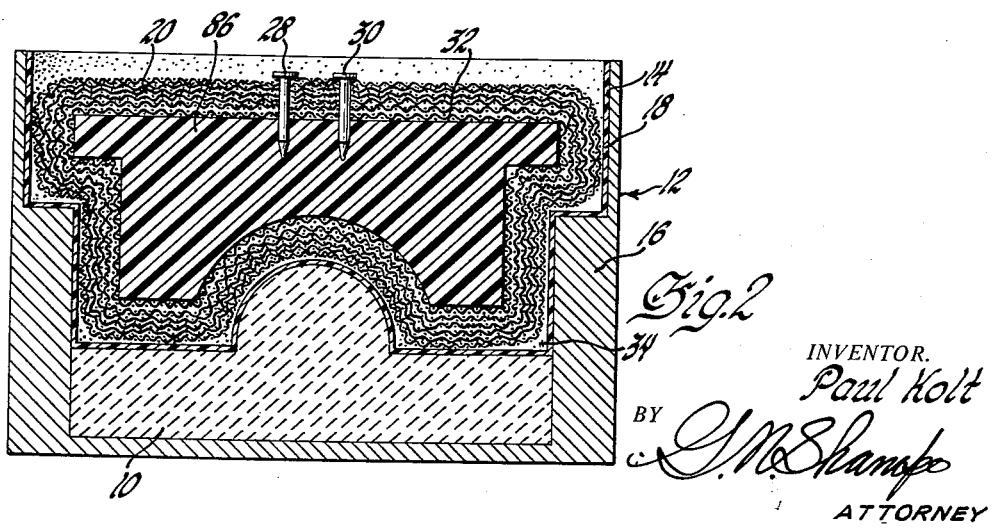
FIGURE 2 is a transverse sectional view showing a mold containing a core completely enveloped by layers of metal mesh.

Referring now to FIGURES 1 and 2, a reinforced plastic die is formed in accordance with my invention from an accurate surface reproduction 10 of the sheet metal surface which is to be formed. A mold 12 having a casting cavity 14 is formed by placing suitable damming 16 around the periphery of this surface reproduction 10. A face coat 18 for the working surface of the die is applied to the surface of the mold 12 within the casting cavity 14. A plurality of layers of metal mesh 20 are then placed within the mold and conformed to the walls defining the casting cavity 14. The metal mesh 20 is cut to a suitable size which will allow the ends 22 and 24 thereof to project out of the casting cavity. A preformed core member 26 is then introduced into the casting cavity 14 over the layers of metal mesh 20 and the portions 22 and 24 of metal mesh projecting from the casting cavity are bent over the top of the core. The ends 22 and 24 are suitably secured at 28 and 30, such as by screws, nails or the like, to the upper surface 32 of the core 26.

After the metal mesh 20 has been conformed to the contours of the walls of the casting cavity 14 and secured around the core 26, a suitable plastic is pressure injected into the area 34 between the core and the face coat, filling the interstices of the mesh 20 and forming a continuous reinforced layer adjacent the core. A suitable hole 36 is made in the core to permit passage of resin to the area between the core and the face coat. It is desirable to provide air holes 38 and 40 at strategic places in the core 26 to facilitate movement of resin throughout the interstices of the screening 20 and eliminate air pockets which impair the strength of the die.

Figure 3:
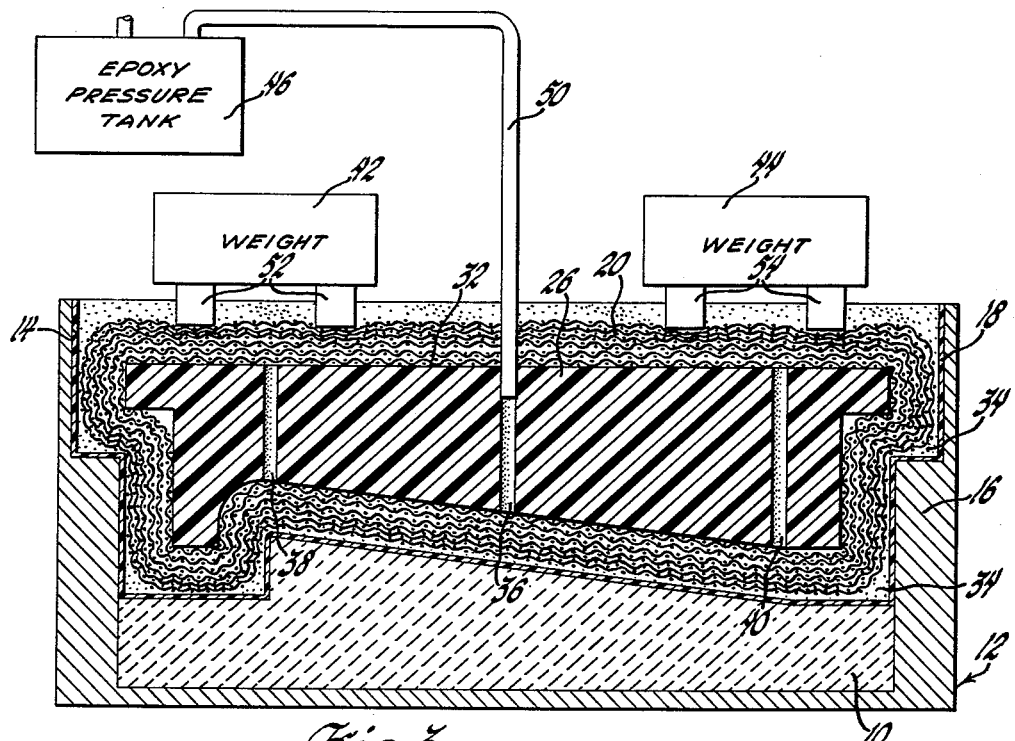
FIGURE 3 is a sectional view of a mold assembly diagrammatically showing means for pressure injecting a plastic resin into the interstices of the metal mesh surrounding the core member of the die.

The pressure of the plastic injected into the casting cavity 14 tends to displace the preformed core 26. As shown in FIGURE 3, sufficient weights 42 and 44 should be applied to the upper surface of the mesh-enveloped core to retain the core within the casting cavity during injection of the plastic. The plastic can be contained in a suitable tank 46 under pressure from a source of compressed air, not shown, and piped directly from the tank to the core passage 36.

Figure 4:
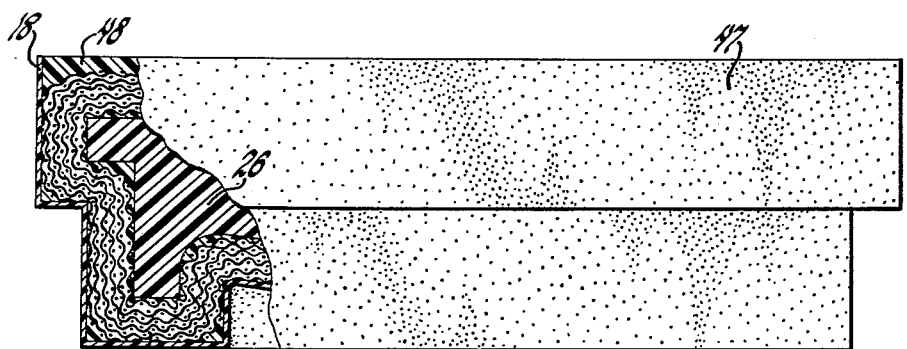
FIGURE 4 is an elevational view in partial section of a plastic die formed in accordance with my invention.

FIGURE 4 more clearly shows that the pressure injection of the plastic between the preformed core in accordance with my invention provides a die 47 having a continuous plastic layer 48 adjacent the core member 26. The plastic which is injected rises up the air holes 38 and 40 in the core, as well as around the core and also fills the interstices of the mesh on the upper surface of the core.

The use of the metal mesh 20 and the pressure injecting method minimizes the possibility of forming air pockets in and adjacent the reinforcing layer. The presence of such air pockets causes a lack of adhesion between the laminate, thereby decreasing the strength of the die. The wire screen forms an exceptionally strong reinforcement for the die and further insures an integral bond between the reinforcing layers and the plastic resins of the face coat and core. The complete envelopment of the core 26 by the metal mesh reinforced layer 48 provides unusually high strength and durability in the die.

In making the die described above, a male wood model having a surface corresponding to the contour of the sheet metal to be stamped is generally first constructed. Plaster, wood or clay may be added in small amounts to the face of the model, where necessary, so that the resultant surface corresponds to that desired for the die to be formed. In this manner, provision may be made for clearance, run-off, flares, etc. which are present in the die.

A plaster cast is made directly from the model. Wood or plaster damming is fitted to the periphery of the model forming a casting cavity in order to properly isolate and distribute the plaster which is to be poured. While the process for forming my new reinforced die is hereinafter described in terms of the female die shown in the drawing, it will be understood, of course, that a generally similar procedure is employed for producing the mating male die.

After the damming is fitted around the model, a liquid wax is applied to the surface of the model and damming forming the casting cavity. A suitable plaster mixture is then introduced into the casting cavity and allowed to harden.

The hardened plaster cast is removed from the model and, using the female plaster cast, a male plaster cast is made. These are the working plasters, male for the die and female for the punch. A suitable wood or plaster damming 16 is fitted around the periphery of the male plaster 10 to form a casting cavity 14. The next step in forming the die involves the formation of a die core 26.

The casting cavity defining members 10 and 16 are covered with a spacing material of wood, clay or the like to a thickness of about ½ inch or more, depending upon the number of layers of reinforcing mesh required in the die. The surface of the wood or clay is preferably covered with a hard sheet wax, which will withstand a temperature of approximately 250° F. to protect the wood and soft clay from heat during the exothermic cure of epoxy resin. Although generally any thickness of sheet wax can be employed, it is preferable that the sheet have a thickness of at least approximately 0.03 inch.

The plastic die core 26 is then gravity cast using a mixture of a hardenable epoxy resin and a suitable filler. This filled epoxy resin is allowed to cure for approximately 24 hours and is subsequently removed from the casting cavity as a hardened die core. I have found it advantageous to form the core member 26 of an epoxy resin mixture containing substantial amounts of a hard filler material. A generally satisfactory filled epoxy resin is one containing, by weight, about 35% to 75% of a suitable powdered filler and 6% to 20% of a catalyst or hardener. More specifically, excellent results are obtained with a composition consisting of approximately one part epoxy resin and two parts atomized aluminum powder. Various materials can be used as a filler in the core, such as stone, powdered metals, ceramics, etc. Among the powdered metals which may be used, atomized aluminum having a mesh size of approximately 120 has been found to provide excellent results.

The cured core member 26 is cleaned, trimmed and finally sand blasted to insure proper bonding of the core member with the surface layer which is to be subsequently applied. As shown in FIGURE 3, it is highly desirable that air vent holes 38 and 40 be suitably made in the die core to insure proper distribution of the resin during subsequent pressure injection. Similarly, a plastic resin feeder hole 36 should be formed in the core to permit suitable pressure injection of the plastic epoxy resin.

After forming the core, the wood or clay spacing material used in making the core is removed from the casting cavity 14 and the reinforcing layup for the die is prepared. A completely dry layup of metal screening 20 is used for the reinforcement. Preferably a very fine window screen type mesh is used for the surface coat pickup. A plurality of layers of coarser screening is successively applied over the initial fine wire mesh screening. Although the mesh size of the successive layers of screening is somewhat variable, highly satisfactory results are obtainable employing #8 mesh screening of $\frac{1}{32}$ inch, $\frac{1}{16}$ inch or $\frac{1}{8}$ inch wire. The thickness of the wire in the mesh used, of course, depends upon both the complexity of contours involved and size of the die. Copper, brass or aluminum screening is highly desirable for use when forming a die having rather complex contours. However, iron screening is generally preferred as it provides a stronger die. Iron screening generally can be used whenever the contours of the die are of such a degree as to permit easy conforming of the iron screening.

The layers of screening 20 are preferably annealed and then introduced into the casting cavity 14 where they are conformed to the mold surface. The screening is then cut to a suitable size, which will permit subsequent enveloping of the preformed die core. Copper screening, for example, can be satisfactorily annealed by heating for approximately 10 minutes at about 950° F. The preferred method of heat treatment, of course, depends upon the nature of screening which is employed. After the heat treatment, the screening is preferably cleaned, such as by immersion in sulfuric acid, and rinsed.

After preforming the screens and removing them from the casting cavity, the walls defining the casting cavity 14 are checked for any damage. Any damage to the walls can be readily repaired employing plaster, clay or the like. After any necessary resurfacing of the walls of the casting cavity has been made, the walls are further prepared to facilitate removal of the formed die from the casting cavity. I have found that especially satisfactory results can be obtained if the walls of the casting cavity are highly waxed and a suitable organic parting agent is applied thereover. Although the preparation of the walls of the casting cavity can be accomplished in a number of ways, such as is well known in the art, I have found that applying two brush coats of a liquid wax and subsequently two coats of a paste wax provide highly satisfactory results. The first layer of the paste wax is preferably rubbed into the surface of the walls, while the second coat is only lightly brushed. After the application of the wax, a coating of a water-soluble polyvinyl alcohol is applied.

After the polyvinyl alcohol has been applied, the casting cavity is ready to receive the surface or face coat 18 of the die. The face coat or die surface layer 18 is of an epoxy resin which contains a suitable wear-resistant filler, such as titanium-carbide, quartz, or the like. This face coat is brushed onto the prepared surface of the mold forming a coating having a thickness of up to approximately $\frac{1}{16}$ inch. Thicker coatings do not always provide satisfactory results. This coating is applied in one layer as two layers tend to delaminate during use of the die.

A resin mixture containing, by weight, about 20% to 70% of a hard, wear-resistant filler, such as titanium-carbide, quartz or the like, together with 6% to 15% of a catalyst of hardener has been found to be satisfactory as a face coat. An example of a filled epoxy resin which is suitable for this purpose is Hysol TC–5562, currently manufactured by Houghton Laboratories, Inc., of Olean, New York. The hardener sold under the designation "TH–4D" by the same company may be satisfactorily used as a catalyst.

The surface coat is allowed to dry for approximately 25 minutes or until it becomes tacky. At this time the preformed fine screen is pressed into intimate association with the resin surface coat. With this initial fine screening in position, the succeeding screen reinforcements are successively pressed into place.

The core 26 is suitably fitted with a feeder pipe 50 and is carefully placed in the casting cavity over the screening. The ends 22 and 24 of each individual layer of screening 20 projecting from the casting cavity 14 are then neatly folded over the core to completely envelop it. The screening 20 is suitably secured by means of screws, nails, staples, etc. and a number of weights are placed on the mesh-enveloped core. Only sufficient weight is applied to the mesh-enveloped upper surface 32 of the core as is required to hold the core down during the subsequent operation. The feeder pipe 50 is then suitably connected to the source 46 of epoxy resin and the resin is pressure fed into the area 34 between the core and surface coat.

Approximately 8 pounds per square inch of pressure has been found to be useful in injecting the plastic. Generally only sufficient pressure is preferred as will permit a fairly rapid distribution of the plastic throughout the interstices of the metal mesh without the formation of air pockets which will deleteriously affect the strength of lamination. Generally a pressure of approximately between 3 pounds per square inch to 15 pounds per square inch can be used.

The resin is continuously introduced until it rises in the casting cavity 14 to such a height that the die core 26 is covered to a depth of approximately ½ inch. The epoxy resin will rise through the air vent holes 38 and 40 and around the die core 26. Since my method includes the injecting of sufficient resin to permit the resin to rise over the upper surface 32 of the die core to a depth of approximately ½ inch, it is generally desirable to employ suitable expendable epoxy blocks 52 and 54 to support the weights 42 and 44 holding the core 26 down. The blocks 52 and 54 will be firmly bound to the epoxy resin and any parts projecting from the upper surface of the finished die 47 can subsequently be removed by grinding.

Generally, satisfactory results can be obtained with plastic dies which have been formed with a pressure injected plastic mixture consisting of approximately 25% to 70%, by weight, of epoxy resin, 30% to 70%, by weight, of a heat-absorbing material, such as a powdered metal, and 6% to 20%, by weight, of a hardener. The filler is preferably a material which is relatively light and able to absorb large amounts of heat to inhibit distortion and uneven contours of the core during curing. Powdered metals, such as aluminum, steel, etc. can be used.

It has been found desirable to allow the filled epoxy resin layers 18 and 48 to cure for at least 24 hours before removing the die from the casting cavity. After the flash is machined off in any suitable manner, the composite reinforced plastic die 47 is complete and ready for use. This die and the mating male die, which may also be formed in the foregoing manner, are then set up in assembled position for metal drawing operations.

The epoxy resin employed in each instance may be a condensation product of epichlorohydrin with bis-phenol A or glycerol. Of course, a mixture of more than one epoxy resin may be used with the filler materials and hardeners to form the various plastic parts of the die. Various monomeric, low molecular weight diepoxides may be employed as the principal epoxy resin constituents. Among the epoxy resins which are appropriate are rigid, room-temperature hardening, thermosetting resins with 100% reactive components when formulated with their complementary hardeners. Diepoxides of this type usually are reaction products of bis-phenol A

$(C_6H_4OHC(CH_3)_2C_6H_4OH$ or dimethyl dipara bis-phenol methane) and epichlorohydrin, the resultant product being the polyglycidyl ether of bis-phenol A. Bakelite ERL-2794 which is currently manufactured and sold by Bakelite Company, New York, New York, is an example of an appropriate epoxy resin.

Typical hardeners which may be successfully employed are aliphatic polyamines which are especially synthesized to give the aforementioned epoxides a wide range of curing speed, viscosity and pot life. Among the suitable polyamines are ethylene diamine, diethylene triamine, triethylene tetramine, etc. These and various other hardeners also may be blended to obtain specific properties in the finished product. Examples of such hardener blends are those identified as BR-18793 and BR-18807 currently manufactured and sold by Bakelite Company.

It is to be understood that while the invention has been described with specific reference to a particular embodiment thereof, it is not to be limited since variations thereof may be made within the scope of the invention as defined in the appended claims.

I claim:

1. A method of producing a reinforced plastic die which comprises forming a plaster cast having a surface with the same general contour as the sheet metal part desired, positioning damming around the periphery of said plaster cast so as to form a casting cavity, applying a mold release agent to surfaces defining said casting cavity, applying a face coat of filled epoxy resin to said surface, thereafter successively applying a plurality of layers of metal mesh over the surface of said face coat, positioning a hardened plastic core member in said casting cavity adjacent said mesh, enveloping said core with said mesh, pressure injecting an epoxy resin interjacent said core and said face coat so as to completely fill the interstices of said mesh and form a reinforced epoxy resin layer surrounding said core, curing said epoxy resin to form a finished die and removing said die from said cavity.

2. A method of producing a reinforced plastic die which comprises forming an accurate reproduction of the surface of a sheet metal part, positioning damming around the periphery of said reproduction so as to form a casting cavity, applying a mold release agent to surfaces defining said casting cavity, applying a face coat of a wear-resistant, hardenable plastic mixture to said surface, placing against said face coat at least one layer of a metal mesh which generally conforms to the contour of said surface, positioning a hardened plastic core member in said casting cavity adjacent said mesh, enveloping said core with said mesh, pressure injecting a suitable hardenable plastic interjacent said core and said face coat so as to completely fill the interstices of said mesh and form a continuous reinforced layer adjacent said core, curing said hardenable plastics to form a finished die and removing said die from said cavity.

3. A method of producing a reinforced plastic die which comprises forming an accurate reproduction of the surface of a sheet metal part, positioning damming around the periphery of said reproduction so as to form a casting cavity, applying a mold release agent to surfaces defining said casting cavity, applying a face coat of a wear-resistant, hardenable epoxy resin mixture to said surface, placing against said face coat at least one layer of a metal mesh which generally conforms to the contour of said surface, positioning a hardened epoxy resin core member in said casting cavity adjacent said mesh, pressure injecting a suitable hardenable epoxy resin interjacent said core and said face coat so as to completely fill the interstices of said mesh and form a continuous reinforced layer adjacent said core, curing said hardenable epoxy resins to form a finished die and removing said die from said cavity.

4. A method of producing a reinforced plastic die which comprises forming an accurate reproduction of the surface of a sheet metal part, positioning damming around the periphery of said reproduction so as to form a casting cavity, applying a mold release agent to surfaces defining said casting cavity, applying a face coat of filled, hardenable epoxy resin to said surface, said epoxy resin containing 20% to 70%, by weight, of a wear-resistant filler material, successively placing against said face coat a plurality of layers of metal mesh which generally conform to the contour of said surface, positioning a preformed core member adjacent said mesh, enveloping said core with said mesh, pressure injecting a second filled, hardenable epoxy resin interjacent said core and said face coat so as to completely fill the interstices of said mesh and form a reinforced layer surrounding said core, said second filled epoxy resin containing, by weight, about 25% to 70% of an epoxy resin, 30% to 70% of a heat-absorbing filler material and 6% to 20% of a suitable hardener, curing said epoxy resins to form a finished die and removing said die from said cavity.

5. A method of producing a reinforced plastic die which comprises forming a plaster cast having a surface with the same general contour as the sheet metal part desired, positioning damming around the periphery of said plaster cast so as to form a casting cavity, applying a mold release agent to surfaces defining said casting cavity defining members, applying to said surface a face coat of a filled, hardenable epoxy resin containing, by weight, approximately 20% to 70% of a wear-resistant filler and 6% to 15% of a suitable hardener, successively placing against said surface a plurality of layers of metal mesh which generally conform to the contour of said surface, positioning adjacent said mesh a core member formed from a resin mixture containing, by weight, about 35% to 75% of an inert filler and 6% to 20% of a suitable hardener, enveloping said core with said mesh, pressure injecting a second filled, hardenable epoxy resin interjacent said core and said face coat so as to completely fill the interstices of said mesh and form a reinforced layer surrounding said core, said second filled epoxy resin containing, by weight, about 25% to 70% of an epoxy resin, 30% to 70% of a heat-absorbing filler material and 6% to 20% of a suitable hardener, curing said hardenable epoxy resins to form a finished die and removing said die from said cavity.

6. A method of producing a reinforced plastic die which comprises forming a reproduction of the surface of a sheet metal part, applying a face coat of a wear-resistant hardenable plastic mixture to said surface, placing against said face coat at least one layer of a metal mesh which generally conforms to the contour of said surface, positioning a hardened plastic core member adjacent said mesh, enveloping said core with said mesh, inducing flow by a pressure differential of a suitable hardenable plastic interjacent said core and said face coat so as to completely fill the interstices of said mesh and form a continuous reinforced layer adjacent said core, curing said hardenable plastics to form a finished die and separating said die from said surface.

7. A method of producing a reinforced plastic die which comprises forming an accurate reproduction of the surface of a sheet metal part, applying a face coat of a wear-resistant hardenable epoxy resin mixture to said surface, placing against said face coat at least one layer of a metal mesh which generally conforms to the contour of said surface, positioning a hardened epoxy resin core member adjacent said mesh, inducing flow by a pressure differential of a suitable hardenable epoxy resin interjacent said core and said face coat so as to completely fill the interstices of said mesh and form a continuous reinforced layer adjacent said core, curing said hardenable epoxy resins to form a finished die and separating said die from said surface.

References Cited in the file of this patent

UNITED STATES PATENTS

| | | |
|---|---|---|
| 2,682,111 | Kish | June 29, 1954 |
| 2,724,868 | Kish | Nov. 29, 1955 |
| 2,734,243 | Lips et al. | Feb. 14, 1956 |
| 2,836,530 | Rees | May 27, 1958 |
| 2,926,427 | Hostetler | Mar. 1, 1960 |

FOREIGN PATENTS

| | | |
|---|---|---|
| 1,152,698 | France | Sept. 9, 1957 |
| 788,156 | Great Britain | Dec. 23, 1957 |